(12) United States Patent
Sherman et al.

(10) Patent No.: US 10,308,807 B2
(45) Date of Patent: Jun. 4, 2019

(54) DISSOLVABLE RUBBER

(71) Applicant: Terves Inc., Euclid, OH (US)

(72) Inventors: Andrew J. Sherman, Mentor, OH (US); Brian Doud, Cleveland Heights, OH (US)

(73) Assignee: Terves Inc., Euclid, OH (US)

( * ) Notice: Subject to any disclaimer, the term of this patent is extended or adjusted under 35 U.S.C. 154(b) by 0 days.

(21) Appl. No.: 15/592,325

(22) Filed: May 11, 2017

(65) Prior Publication Data

US 2017/0349747 A1 Dec. 7, 2017

Related U.S. Application Data

(60) Provisional application No. 62/344,127, filed on Jun. 1, 2016.

(51) Int. Cl.

| | | |
|---|---|---|
| *C08L 75/04* | (2006.01) | |
| *C08L 9/02* | (2006.01) | |
| *C08L 17/00* | (2006.01) | |
| *C08L 29/04* | (2006.01) | |
| *C08L 67/04* | (2006.01) | |

(52) U.S. Cl.
CPC .............. *C08L 75/04* (2013.01); *C08L 9/02* (2013.01); *C08L 17/00* (2013.01); *C08L 29/04* (2013.01); *C08L 67/04* (2013.01); *C08L 2207/04* (2013.01); *C08L 2207/20* (2013.01)

(58) Field of Classification Search
CPC .......... C08L 75/04; C08L 17/00; C08L 67/04; C08L 9/02; C08L 29/04; C08L 2207/04; C08L 2207/20
See application file for complete search history.

(56) References Cited

U.S. PATENT DOCUMENTS

| | | |
|---|---|---|
| 5,641,562 A | 6/1997 | Larson et al. |
| 8,338,508 B2 | 12/2012 | Shi et al. |
| 2003/0040574 A1* | 2/2003 | Schertz ............... C08J 5/18 525/57 |
| 2008/0149351 A1 | 6/2008 | Marya et al. |
| 2008/0277109 A1 | 11/2008 | Vaidya |
| 2009/0074999 A1* | 3/2009 | Hiruma ............... B32B 27/36 428/34.9 |
| 2009/0084539 A1 | 4/2009 | Duan |
| 2010/0081730 A1* | 4/2010 | Unseld ................ B60C 1/00 523/152 |
| 2011/0277996 A1* | 11/2011 | Cullick .............. E21B 33/138 166/250.12 |
| 2013/0025859 A1* | 1/2013 | Liang ................. E21B 41/00 166/278 |
| 2014/0060843 A1* | 3/2014 | Murphy ............... C09K 8/03 166/310 |
| 2015/0090156 A1* | 4/2015 | Combs ................ C09J 103/06 106/145.5 |
| 2015/0285026 A1 | 10/2015 | Frazier |
| 2015/0324676 A1 | 11/2015 | Terao |

FOREIGN PATENT DOCUMENTS

WO  2016032621  3/2016

OTHER PUBLICATIONS

International Search Report and Written Opinion, ISA/US, in corresponding application No. PCT/US032079 (dated Aug. 4, 2017).

\* cited by examiner

*Primary Examiner* — Robert S Jones
(74) *Attorney, Agent, or Firm* — Fay Sharpe LLP

(57) ABSTRACT

A degradable elastomeric material that is formed from a composite blend of elastomeric particles in a continuous degradable binder. The degradable binder is generally a water-soluble binder which has a temperature dependent solubility in water and brine systems. Such degradable elastomers are particularly useful in the fabrication of degradable oil tools, among other applications.

37 Claims, 6 Drawing Sheets

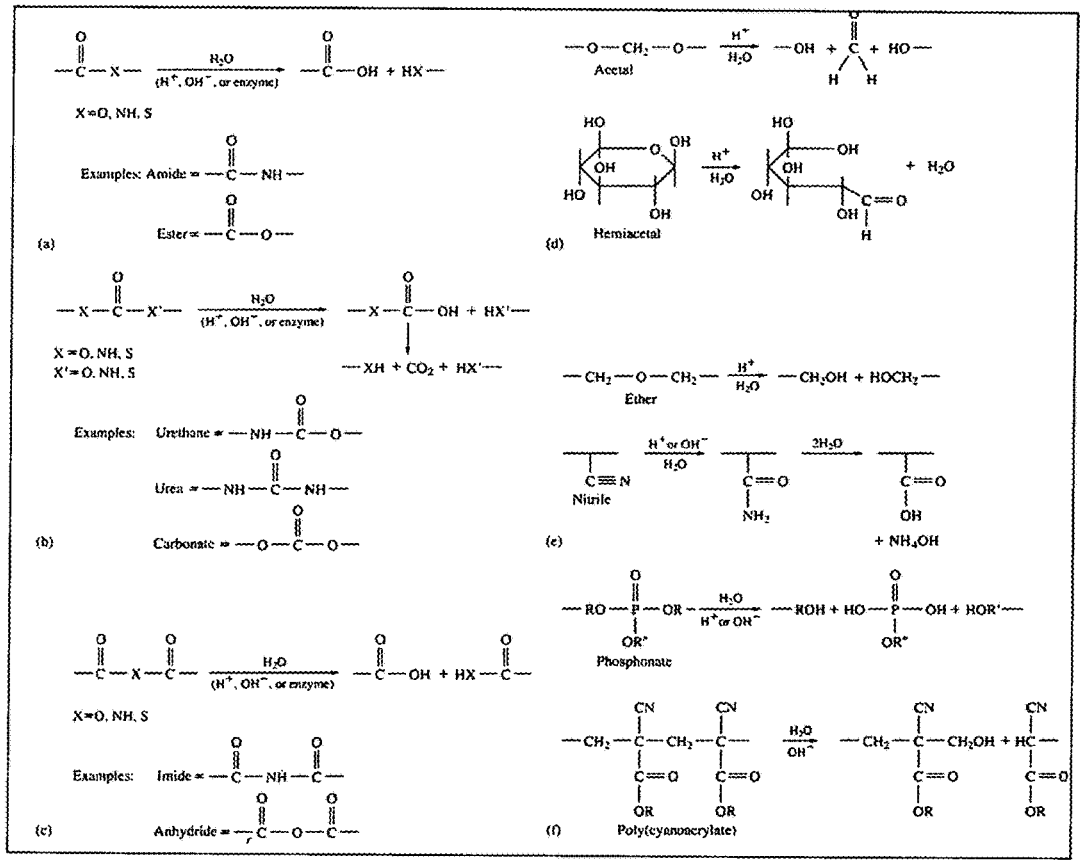
FIG. 1: Hydrolysis Reactions

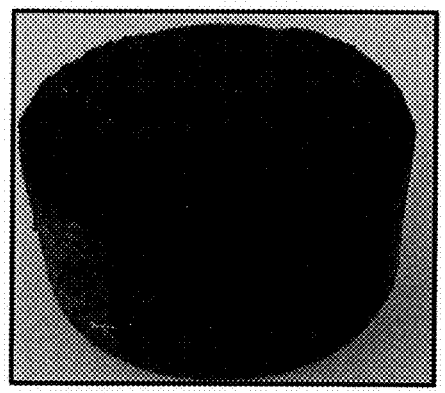
Fig 2A: Before Dissolution (0 hours)
OD: 1.125", Thickness: 0.5"
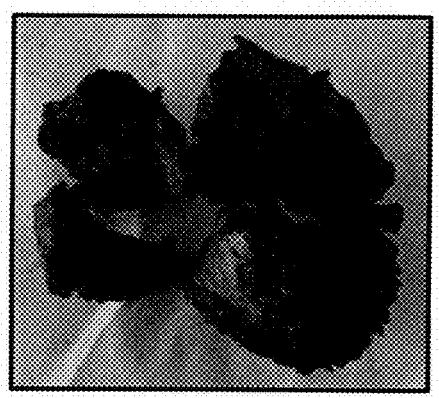
Fig 2B: After 10 hours in
3% KCl at 150°F.
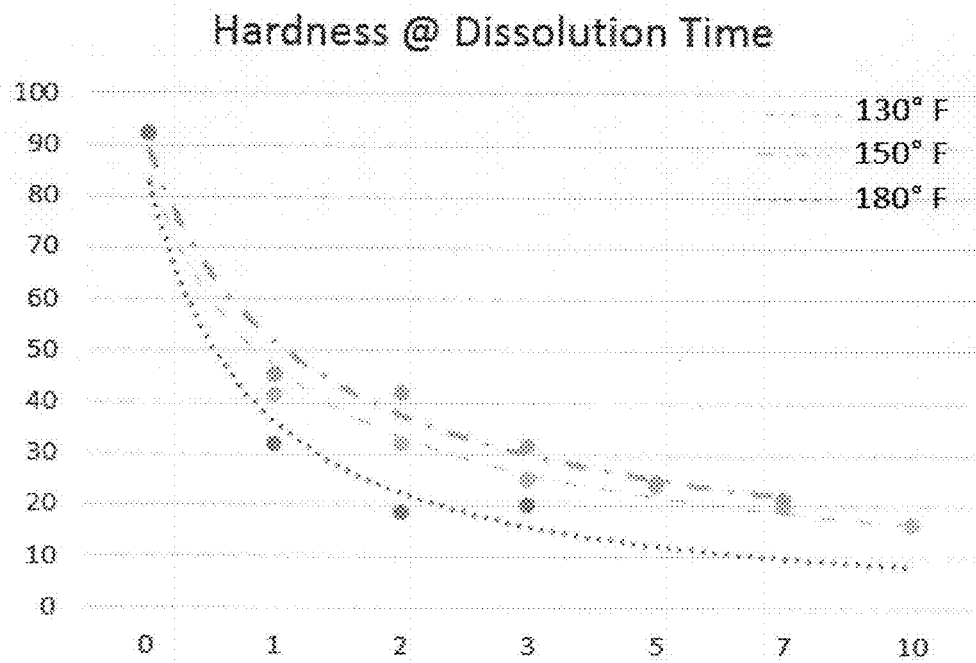
FIG. 2C

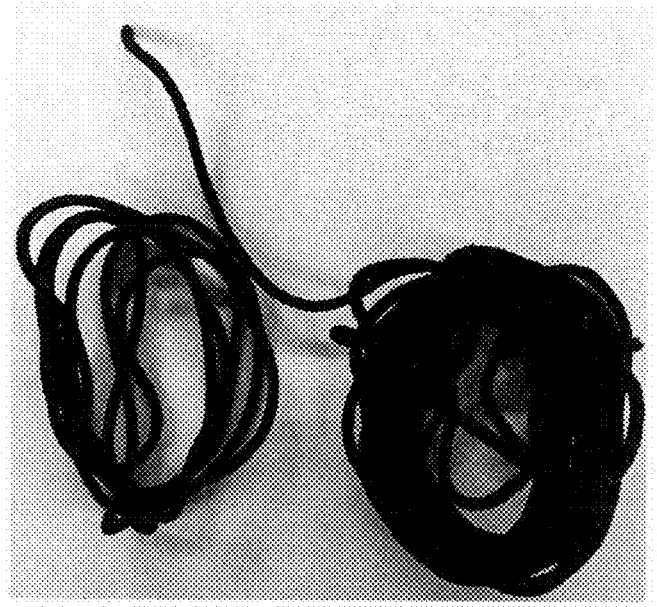
FIG. 3 – Extruded Filament Product
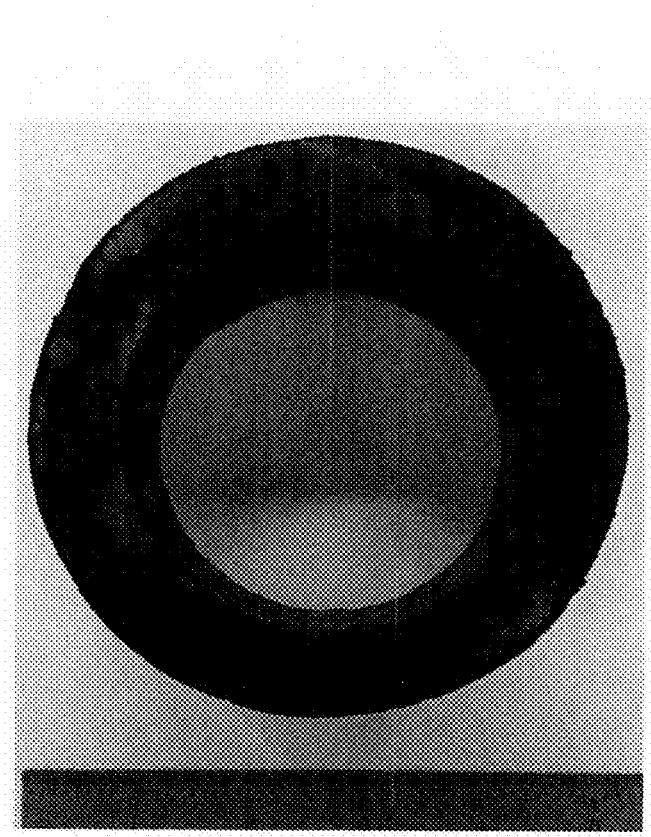
FIG. 4 – Formed Seal

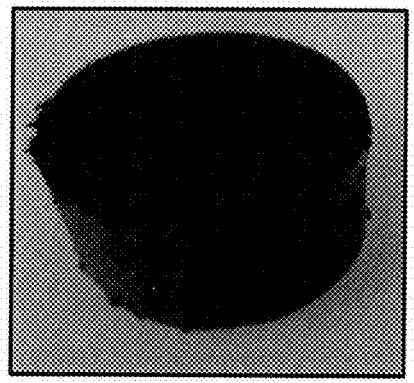
FIG. 5A: Before Dissolution (0 Hours)
OD: 1.125", Thickness: 0.5"
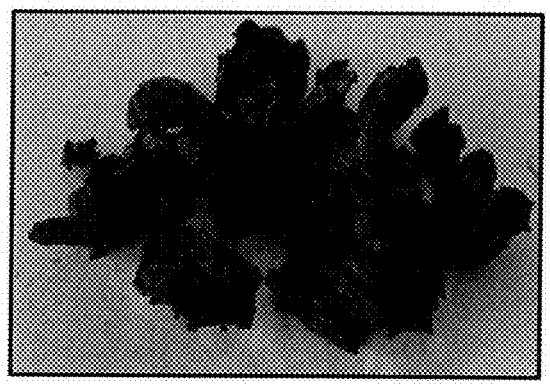
FIG. 5B: Fig 6: After 10 hours in 3% KCl at 150°F
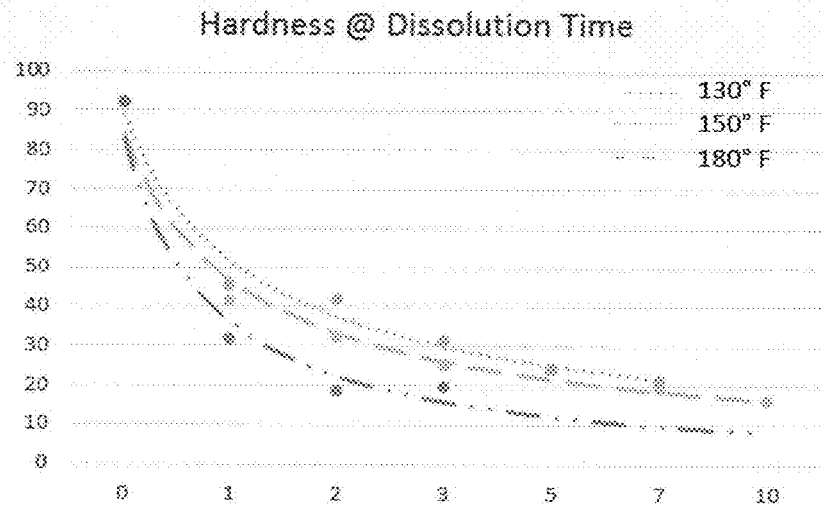
FIG. 5C

DISSOLVABLE RUBBER

The present invention claims priority on U.S. Provisional Application Ser. No. 62/344,127 filed Jun. 1, 2016, which is incorporated herein by reference.

The present invention relates to a degradable elastomer composition having a controlled microstructure/morphology in that discrete elastomeric particles are dispersed in a continuous liquid-soluble binder phase.

BACKGROUND OF THE INVENTION

Degradable oil tools have been developed which allow for temporary isolation of wellbores and which can be removed without intervention such as retrieval or drilling from the surface. These tools are generally fabricated from dissolvable or degradable metals or polymers, including degradable Al, Zn, and Mg alloys, and water-degradable polymers such as PVA, PLA and PGA. However, these degradable materials are not generally elastomeric, and non-degradable elastomeric seals are used to provide sealing against fluid flow.

Elastomeric sealing compounds that dissolve and degrade at rates similar to those of the degradable structural alloys (such as Tervalloy™), are stable for the period of operation under low temperatures during pumping operations, and degrade at high shut-in or flowback temperatures to reduce or eliminate any residual debris are desired. Such dissolvable, structural elastomeric materials are not readily available, and do not have the properties required or desired.

Biodegradable polymers and films have been developed that are formed from a water-dispersible polymer. For example, U.S. Pat. No. 6,296,914 (to Kerins et al.) describes a water-sensitive film that may include, for instance, polyethylene oxide, ethylene oxide-propylene oxide copolymers, polymethacrylic acid, polymethacrylic acid copolymers, polyvinyl alcohol, poly(2-ethyl oxazoline), polyvinyl methyl ether, polyvinyl pyrrolidone/vinyl acetate copolymers, methyl cellulose, ethyl cellulose, hydroxypropyl cellulose, hydroxypropyl methyl cellulose, ethyl hydroxyethyl cellulose, methyl ether starch, poly (n-isopropyl acrylamide), poly. N-vinyl caprolactam, polyvinyl methyl oxazolidone, poly (2-isopropyl-2-oxazoline), poly (2,4-dimethyl-6-triazinyl ethylene), or a combination thereof. Some of these polymers, however, are not thermoplastic or moldable and, thus, are not readily processed using molding equipment. Further, these elastomers are also not elastic and, thus, may be limited in their use when considered for sealing applications.

In response to these and other problems with prior art elastomeric sealing compounds, attempts have been made to form water-shrinkable materials from elastomeric and water-dispersible polymers. One such elastomer is described in U.S. Pat. No. 5,641,562 to (Larson et al.). In one example, the elastomer contains polyethylene oxide having a molecular weight of about 200,000 and an ethylene vinyl acetate copolymer. Although such elastomers are shrinkable, they nevertheless are not dispersible or disintegrable in water so as to achieve complete flushability. Furthermore, the elastomers are not truly elastic.

A more recent elastomeric biodegradable film described in U.S. Pat. No. 8,338,508 (to Shi et al.) describes a water-sensitive film containing an olefinic elastomer that is both elastic and water-sensitive (e.g., water-soluble, water-dispersible, etc.) in that it loses its integrity over time in the presence of water. To achieve these dual attributes, the film contains an olefinic elastomer and a water-soluble polymer. Although these polymers are normally chemically incompatible due to their different polarities, Shi discloses that phase separation can be minimized by selectively controlling certain aspects of the elastomer, such as the nature of the polyolefin, water-soluble polymer, and other elastomer components, the relative amount of the elastomer components, and so forth. For example, certain water-soluble polymers that have a low molecular weight and viscosity can be selected to enhance their melt compatibility with nonpolar polyolefins. This, in turn, may result in a film that is generally free of separate phases, which would otherwise limit the ability of the water-soluble polymer to contact water and disperse. As such, Shi discloses the maintaining of the elastomeric and dissolvable components in a single phase, using chemistry developments to prevent segregation. These materials are suitable for use in the form of films, but do not have the structural properties required for high pressure sealing applications and cannot be fabricated into bulk objects.

In view of the current state of elastomeric materials, there is a need for an elastomeric material that dissolves and degrades at rates similar to those of the degradable structural alloys (such as Tervalloy™), which are stable for the period of operation under lower temperatures during pumping operations, and which degrades at high shut-in or flowback temperatures to reduce or eliminate any residual debris of the elastomeric materials in the wellbore.

SUMMARY OF THE INVENTION

The present invention is directed to an elastomeric composite material that is water-dispersable into fine particles which can be readily flushed from a wellbore or other system. The elastomeric material of the present invention is readily formable into structural seals, including O-rings, Chevron seals, and washers suitable for the sealing of oil and gas wells and other applications when designed into appropriate seal geometries and closures. However, it can be appreciated that the elastomeric material can be formed into other types of structures.

As used herein, the term "elastomeric" and "elastic" refers to a material that, upon application of a stretching force, is stretchable in at least one direction and which, upon release of the stretching force, contracts/returns to approximately its original dimension. As defined herein, an elastomeric material is a material that has a stretched length that is at least 20% greater than its relaxed unstretched length, and which material will recover to within at least 30% of its stretched length upon release of the stretching force. For example, a one-inch sample of a material that is stretchable to at least 1.2 inches and which, upon release of the stretching force, recovers to a length of 1.14 inches or less is defined as an elastomeric material. Generally, the elastomeric material will have a stretched length that is at least 30% greater than its relaxed unstretched length, and typically at least 50% greater than its relaxed unstretched length, and will recover to 50-100% (and all values and ranges therebetween) of its stretched length upon release of the stretching force, and typically within 80-100% of its stretched length upon release of the stretching force.

As used herein the terms "extensible" or "extensibility" refers to a material that stretches or extends in the direction of an applied force by at least about 20% of its relaxed length or width, typically at 30% of its relaxed length or width, and more typically at least 50% of its relaxed length or width. An extensible material does not necessarily have recovery properties. For example, an elastomeric material is an extensible material having recovery properties. An elastomer can be extensible, but not have recovery properties (e.g., does not recover to within at least 30% of its stretched length upon release of the stretching force), and thus, be an extensible, non-elastic material.

As used herein, the term "percent stretch" is defined as the degree to which a material stretches in a given direction when subjected to a certain force. In particular, percent stretch is determined by measuring the increase in length of the material in the stretched dimension, dividing that value by the original dimension of the material, and then multiplying by 100.

As used herein, the term "set" refers to retained elongation in a material sample following the elongation and recovery, i.e., after the material has been stretched and allowed to relax during a cycle test.

The elastomeric material in accordance with the present invention includes elastomer and water-soluble polymer and/or water-reactive polymer, and optionally one more of plasticizer, compatibilzer, and/or additional components. The elastomeric material is at least a two-phase system wherein a first phase includes water-soluble polymer and a second phase includes elastomer. The one or more plasticizer, compatibilzer, and/or optional additional components can be included in the first and/or second phases, or can form a third or fourth phase in the elastomeric material.

SUMMARY OF THE FIGURES

FIG. 1 illustrates various types of types of hydrolysis reactions.

FIG. 2A is a picture of a plug of elastomeric material in accordance with the present invention.

FIG. 2B is a picture of the plug of elastomeric material illustrated in FIG. 2A that has been degraded.

FIG. 2C is graph of the hardness of the elastomeric material illustrated in FIG. 2A as a function of time as the elastomeric material is degraded.

FIG. 3 is a picture of an extruded filament formed from the elastomeric material in accordance with the present invention.

FIG. 4 is a picture of a seal that was formed from the elastomeric material in accordance with the present invention.

FIG. 5A is a picture of a plug of elastomeric material in accordance with the present invention.

FIG. 5B is a picture of the plug of elastomeric material illustrated in FIG. 2A that has been degraded.

FIG. 5C is graph of the hardness of the elastomeric material illustrated in FIG. 2A as a function of time as the elastomeric material is degraded.

A. ELASTOMER

Figure 6:
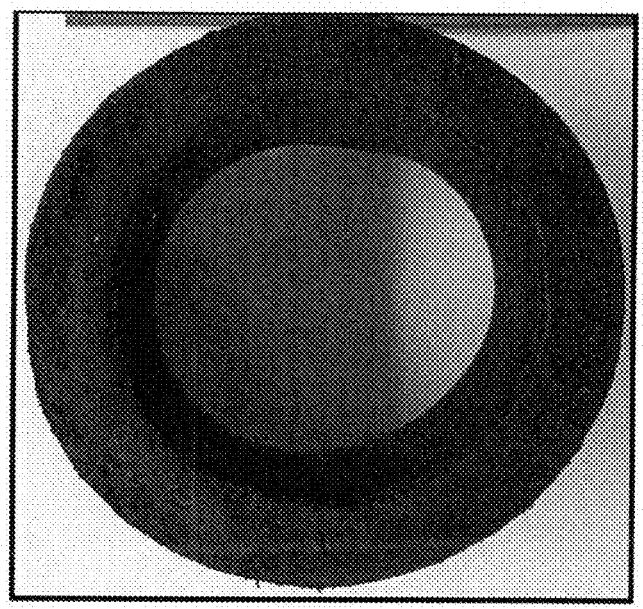
FIG. 6 is a picture of a seal that was formed from the elastomeric material in accordance with the present invention.

The elastomeric material can include one or more elastomers. The elastomer can constitute about 5 vol. % to about 90 vol. % of the elastomeric material (and all values and ranges therebetween). In one non-limiting embodiment, the elastomer constitutes about 15 vol. % to about 80 vol. % of the elastomeric material. In another non-limiting embodiment, the elastomer constitutes about 20 vol. % to about 75 vol. % of the elastomeric material. In another non-limiting embodiment, the elastomer constitutes about 15 vol. % to about 60 vol. % of the elastomeric material. In another non-limiting embodiment, elastomer generally constitutes the greatest weight percent of any of the components of the elastomeric material. In another non-limiting embodiment, the elastomer constitutes at least 50 vol. % of the elastomeric material. Generally, the elastomer contributes at least about 80% of the hardness and mechanical response to the elastomeric material; however, this is not required.

Elastomer-Olefinic

Thermoplastic rubbers are well suited to forming/molding into complex shapes. These thermoplastic rubbers are typically mixtures of a rubber phase and a thermoplastic phase such as, but not limited to, polyethylene and/or polopropylene. Olefinic rubbers include polybutadienes, polyisobutylene (PIB), ethylene propylene rubber (EPR), ethylene propylene diene monomer (M-class) rubber (EPDM rubber), and others.

Various olefinic elastomers can be employed in the degradable elastomer of the present invention. In one non-limiting embodiment, the olefinic elastomer is a polyolefin that has or is capable of exhibiting a substantially regular structure ("semi-crystalline"). Such olefinic elastomers can be substantially amorphous in their underformed state, but can form crystalline domains upon stretching. The degree of crystallinity of the olefin polymer can be about 3% to about 30% (and all values and ranges therebetween), in some embodiments about 5% to about 25%, and in some embodiments about 5% and about 15%. Likewise, the olefinic elastomer can have a latent heat of fusion ($\Delta H_f$), which is another indicator of the degree of crystallinity, of about 15 to about 75 Joules per gram ("J/g") (and all values and ranges therebetween), in some embodiments about 20 to about 65 J/g, and in some embodiments about 25 to about 50 J/g. The olefinic elastomer may also have a Vicat softening temperature of about 10° C. to about 100° C. (and all values and ranges therebetween), in some embodiments about 20° C. to about 80° C., and in some embodiments about 30° C. to about 60° C. The olefinic elastomer can have a melting temperature of about 20° C. to about 120° C. (and all values and ranges therebetween), in some embodiments about 35° C. to about 90° C., and in some embodiments about 40° C. to about 80° C. The latent heat of fusion ($\Delta T_f$) and the melting temperature of the olefinic elastomer can be determined using differential scanning calorimetry (DSC) in accordance with ASTM D-3417 as is well known to those skilled in the art. The Vicat softening temperature can be determined in accordance with ASTM D-1525.

Exemplary semi-crystalline olefinic elastomers that can be used in the degradable elastomer of the present invention include polyethylene, polypropylene, blends and copolymers thereof. In one non-limiting embodiment, a polyethylene is employed that is a copolymer of ethylene and an α-olefin, such as, but not limited to, a $C_3$-$C_{20}$ α-olefin and/or $C_3$-$C_{12}$ α-olefin. Suitable α-olefins can be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents;

1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desirable α-olefin comonomers are 1-butene, 1-hexene and 1-octene. The ethylene content of such copolymers can be about 60 mole % to about 99 mole % (and all values and ranges therebetween), in some embodiments about 80 mole % to about 98.5 mole %, and in some embodiments about 87 mole % to about 97.5 mole %. The α-olefin content may likewise range about 1 mole % to about 40 mole % (and all values and ranges therebetween), in some embodiments about 1.5 mole % to about 15 mole %, and in some embodiments about 2.5 mole % to about 13 mole %. Propylene polymers may also be suitable for use as an olefinic elastomer. In one non-limiting embodiment, the semi-crystalline propylene-based polymer includes a copolymer of propylene and an α-olefin, such as, but not limited to, a $C_2$-$C_{20}$ α-olefin and/or $C_2$-$C_{12}$ α-olefin. Particularly desired are α-olefin comonomers of ethylene, 1-butene, 1-hexene and 1-octene. The propylene content of such copolymers can be about 60 mole % to about 99.5 vol. % (and all values and ranges therebetween), in some embodiments about 80 mole % to about 99 mole %, and in some embodiments about 85 mole % to about 98 mole %. The α-olefin content can likewise be about 0.5 mole % to about 40 mole % (and all values and ranges therebetween), in some embodiments about 1 mole % to about 20 mole %, and in some embodiments about 2 mole % to about 15 mole %. Some non-limiting suitable polyolefin plastomers are available under the designation ENGAGE™ and AFFINITY™ from Dow Chemical Company of Midland, Mich.

Elastomer-Ethylene

Some non-limiting ethylene elastomers that can be used in the present invention are ethylene-based copolymer plastomers available under the EXACT™ from ExxonMobil Chemical Company of Houston, Tex. (ethylene octane copolymer—ethylene based plastomer resin). Still other suitable ethylene polymers are available from The Dow Chemical Company under the designations DOWLEX™ (Linear low-density polyethylene—LLDPE) and ATTANE™ (Ultra Low Density Polyethylene—ULDPE). Such ethylene polymers are described in U.S. Pat. No. 4,937,299 to Ewen et al. (polymer blends of polyethylenes such as high density polyethylene (HDPE) and linear low density polyethylene (LLDPE) and with copolyethylene higher alpha-olefins having from 3 to about 10 carbon atoms and preferably 4 to 8 carbon atoms. Illustrative of the higher alpha-olefins are propylene, butene-1, hexene-1 and octene-1. Preferably, the alpha-olefin is propylene or butene-1); U.S. Pat. No. 5,218,071 to Tsutsui et al. (ethylene copolymers formed from ethylene and α-olefins of 3-20 carbon atoms are copolymerized so that a density of the resulting copolymers becomes 0.85-0.92 g/cm$^3$); U.S. Pat. No. 5,272,236 to Lai et al. (A substantially linear olefin polymer characterized as having: a) a melt flow ratio, $I_{10}/I_2$, ≥5.63, b) a molecular weight distribution, $M_w/M_n$, defined by the equation: $M_w/M_n \leq (I_{10}/I_2)-4.63$, and c) a critical shear stress at onset of gross melt fracture of greater than about $4\times10^6$ dyne/cm$^2$, wherein the olefin polymer is further characterized as a copolymer of ethylene with a $C_3$-$C_{20}$ alpha-olefin); and U.S. Pat. No. 5,278,272 to Lai et al. (A substantially linear olefin polymer characterized as having: a) a melt flow ratio, $I_{10}/I_2$, ≤5.63, b) a molecular weight distribution, $M_w/M_n$, defined by the equation: $M_w/M_n \leq (I_{10}/I_2)-4.63$, and c) a critical shear rate at onset of surface melt fracture of at least 50 percent greater than the critical shear rate at the onset of surface melt fracture of a linear olefin polymer having about the same $I_2$ and $M_w/M_n$, and wherein the olefin polymer is further characterized as a copolymer of ethylene with a $C_3$-$C_{20}$ alpha-olefin), which are all incorporated herein in by reference. Suitable propylene polymers are commercially available under the designations VISTAMAXX™ (Polyolefin Copolymer/Terpolymer) from ExxonMobil Chemical Co. of Houston, Tex.; FINA™ (e.g., FINA™ 8573) from Atofina Chemicals of Feluy (a low melting, high ethylene random copolymer), Belgium; TAFMER™ available from Mitsui Petrochemical Industries (low crystalline or amorphous α-olefin copolymer); and VERSIFY™ available from Dow Chemical Co. of Midland, Mich. (propylene-ethylene copolymers). Other examples of suitable propylene polymers are described in U.S. Pat. No. 6,500,563 to Datta et al. (A polymer formed by: (a) polymerizing propylene or a mixture of propylene and one or more monomers selected from $C_2$ or $C_3$-$C_{20}$ alpha olefins in the present of a polymerization catalyst wherein a substantially isotactic propylene polymer containing at least 90% by weight polymerized propylene is obtained to form a propylene polymer; (b) polymerizing a mixture of ethylene and propylene in the presence of a chiral metallocene catalyst, wherein a crystallizable copolymer of ethylene and propylene is obtained comprising up to 35% by weight ethylene, containing isotactically, crystallizable propylene sequences; and (c) blending the propylene polymer of step (a) with the crystallizable copolymer of step (b) to form a blend); U.S. Pat. No. 5,539,056 to Yang et al. (a polypropylene blend composition comprising about 60 to about 90 weight percent of an amorphous polypropylene having a $M_w$ of at least about 150,000 and a $M_w/M_n$ of about 3 or less and from about 40 to 10 weight percent of a crystalline isotactic polypropylene having a $M_w$ of less than about 300,000, provided that the $M_w$ of the amorphous polypropylene is greater than the $M_w$ of the crystalline isotactic polypropylene); and U.S. Pat. No. 5,596,052 to Resconi et al., all of which are incorporated herein by reference.

As can be appreciated, other or additional olefinic elastomers can also be used in the present invention. In one non-limiting embodiment, the thermoplastic elastomer can be a styrene-olefin block copolymer, such as, but not limited to, styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. Such polymers can be formed by selective hydrogenation of styrene-diene block copolymers, such as described in U.S. Pat. Nos. 4,663,220; 4,323,534; 4,834,738; 5,093,422; and 5,304,599, all of which are hereby incorporated by reference. Particularly suitable thermoplastic elastomers are available from Kraton Polymers LLC of Houston, Tex. under the trade name KRATON®. Other commercially available block copolymers include the S-EP-S elastomeric copolymers available from Kuraray Company, Ltd. of Okayama, Japan, under the trade designation SEPTON®. Also suitable are polymers composed of an A-B-A-B tetrablock copolymer such as discussed in U.S. Pat. No. 5,332,613 to Taylor et al., which is incorporated herein by reference. An example of such a tetrablock copolymer is a styrene-poly(ethylene-propylene)-styrene-poly(ethylene-propylene) ("S-EP-S-EP") block copolymer.

Elastomer-Vulcanized

Another type of elastomers that can be used in the present invention is traditional vulcanized (thermoset) elastomers, such as, but not limited to, all forms of silicone rubber, urethane rubber, natural rubber, nitrile rubber, and fuoropolymer rubbers. Nitrile rubbers (NBR) and hydrogenated nitrile rubbers, vinylidene fluoride CO and terpolymers FKM), propylene-tetraflouroethylene (FEPM, AFLAS®), and perfolouroelastomers (FFKM, Kalrez®, CHEMRAZ®) can be used with suitable adhesive additions.

Elastomer-Powdered Nitrile Rubber

Powdered nitrile rubber such as NBR (Baymod®, Nipol® and Nitroflex) can also be used as a basic elastomeric element. The $T_g$ of these materials is in the range of −30 C to −40 C. Nitrile rubber can also be mixed with acrylate-butadiene rubber (ABR) or styrene-butadiene rubber (SBR) which can be used as filler. There is also an opportunity to re-use rubber from scrap tires which can be a great asset to the environment.

In one non-limiting embodiment, one or more of the elastomers used in the elastomeric material are selected from the group consisting of natural rubber, vulcanized rubber, silicone, polyurethane, synthetic rubber, polybutadiene, powdered NBR (with different acrylonitrile contents), polyisobutylene, acrylate-butadiene rubber, and styrene butadiene rubber.

B. WATER-SOLUBLE OR WATER-REACTIVE POLYMER

The elastomeric material includes one or more water-soluble (WS) polymers and/or water-reactive (WR) polymers. The water-soluble polymers and/or water-reactive polymers constitutes about 5 vol. % to about 60 vol. % of the elastomeric material (and all values and ranges therebetween), typically about 8 vol. % to about 45 vol. % of the elastomeric material, more typically about 20 vol. % to about 40 vol. % of the elastomeric material, and even more typically about 20 vol. % to 35 vol. %.

The water-soluble polymer and/or water-reactive polymer generally has low solubility below about 30° C. and increased solubility at about 55° C.-180° C. (and all values and ranges therebetween) when exposed to liquids typically used in fracking environments (e.g., water, brine, fracking additives, and/or oil), a polymer that is degradable by hydrolysis or solvates into soluble elements such as monomers or chemically altered soluble polymers. Generally, the water-soluble polymer and/or water-reactive polymer has an acceptable degradation rate (e.g., degrades at least 10% within 2-3 hours) at at least 55° C., or at least 70° C., or at least 100° C., or at least 110° C., or at least 135° C., or at least 180° C., and has low or essentially no reactivity (does not dissolve or degrade) at temperatures below about 30° C. (degrades less than 1% after 5 hours).

Such water-soluble polymers and/or water-reactive polymers can be formed from monomers such as, but not limited to, vinyl pyrrolidone, hydroxyethyl acrylate or methacrylate (e.g., 2-hydroxyethyl methacrylate), hydroxypropyl acrylate or methacrylate, acrylic or methacrylic acid, acrylic or methacrylic esters or vinyl pyridine, acrylamide, vinyl acetate, vinyl alcohol (hydrolyzed from vinyl acetate), ethylene oxide, polyvinylpyrrolidone derivatives thereof, and so forth. Other examples of suitable monomers are described in U.S. Pat. No. 4,499,154 to James et al., which is incorporated herein by reference. The resulting water-soluble polymers and/or water-reactive polymers can be homopolymers or interpolymers (e.g., copolymer, terpolymer, etc.), and can be nonionic, anionic, cationic, or amphoteric. In addition, the water-soluble polymers and/or water-reactive polymers can be of one type (i.e., homogeneous), or mixtures of different water-soluble polymers can be used (i.e., heterogeneous). In one non-limiting embodiment, the water-soluble polymers and/or water-reactive polymers contains a repeating unit having a functional hydroxyl group, such as, but not limited to, polyvinyl alcohol (PVOH), copolymers of polyvinyl alcohol (e.g., ethylene vinyl alcohol copolymers, methyl methacrylate vinyl alcohol copolymers, etc.), etc. Vinyl alcohol polymers, for instance, have at least two or more vinyl alcohol units in the molecule and can be a homopolymer of vinyl alcohol, or a copolymer containing other monomer units. Vinyl alcohol homopolymers can be obtained by hydrolysis of a vinyl ester polymer, such as, but not limited to, vinyl formate, vinyl acetate, vinyl propionate, etc. Vinyl alcohol copolymers can be obtained by hydrolysis of a copolymer of a vinyl ester with an olefin having 2 to 30 carbon atoms, such as, but not limited to, ethylene, propylene, 1-butene, etc.; an unsaturated carboxylic acid having 3 to 30 carbon atoms, such as, but not limited to, acrylic acid, methacrylic acid, crotonic acid, maleic acid, fumaric acid, etc., or an ester, salt, anhydride or amide thereof; an unsaturated nitrile having 3 to 30 carbon atoms, such as, but not limited to, acrylonitrile, methacrylonitrile, etc.; a vinyl ether having 3 to 30 carbon atoms, such as, but not limited to, methyl vinyl ether, ethyl vinyl ether, etc.; and so forth.

The degree of hydrolysis can be selected to obtain a desired solubility, etc., of the water-soluble polymers and/or water-reactive polymers. For example, the degree of hydrolysis can be about 60 mole % to about 95 mole % (and all values and ranges therebetween), in some embodiments about 80 mole % to about 90 mole %, and in some embodiments about 85 mole % to about 89 mole %. Examples of suitable partially hydrolyzed polyvinyl alcohol polymers are available under the designation CELVOL™ from Celanese Corp. Other suitable partially hydrolyzed polyvinyl alcohol polymers are available under the designation ELVANOL™ from DuPont. SELVOL™ from Sekisui chemicals, POLYOX™ and Walocel™ from Dow Chemicals are other options.

The one or more water-soluble polymers and/or water-reactive polymers used in elastomeric material of the present invention generally have a low molecular weight. For example, the water-soluble polymers and/or water-reactive polymers can have a number average molecular weight ($M_n$) of about 1,000 to about 80,000 grams per mole (and all values and ranges therebetween), in some embodiments about 5,000 to about 60,000 grams per mole, and in some embodiments about 10,000 to about 40,000 grams per mole. Likewise, the one or more water-soluble polymers and/or water-reactive polymers can also have a weight average molecular weight ($M_w$) of about 10,000 to about 150,000 grams per mole (and all values and ranges therebetween), in some embodiments from about 20,000 to about 100,000 grams per mole, and in some embodiments, from about 30,000 to about 75,000 grams per mole. The ratio of the weight average molecular weight to the number average molecular weight ($M_w/M_n$), i.e., the "polydispersity index", is also relatively low. For example, the polydispersity index is typically about 1 to about 4 (and all values and ranges therebetween), in some embodiments about 1.1 to about 3, and in some embodiments about 1.2 to about 2.5. The water-soluble polymers and/or water-reactive polymers may also have a solution viscosity of about 50 to about 800 milliPascal seconds (mPas) (and all values and ranges therebetween), in some embodiments about 100 to about 700 mPas, and in some embodiments about 200 to about 600 mPas. The solution viscosity is measured as a 4 percent aqueous solution at 20° C. by the Hoeppler falling ball method in accordance with ASTM-D 1343-56 Part 8, 1958, page 486

Some polymers are known to degrade by solvolysis (primarily hydrolysis) in high temperature, high pressure fluid (water) systems. Step-growth polymers like polyesters, polyamides and polycarbonates can be degraded by solvolysis and mainly hydrolysis to give lower molecular weight molecules. Polyamide is particularly sensitive to degradation by acids and high temperature water, as the reverse reaction of the synthesis of the polymer:

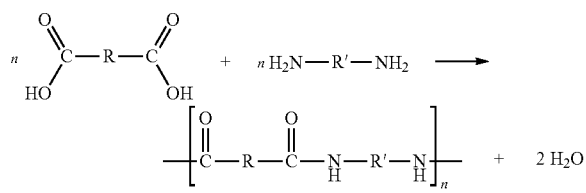

During hydrolysis, there is a chemical reaction with the polymer chain, causing the polymer to break down into water-soluble units. Three mechanisms are known, consisting of breaking crosslinks to allow solvation, breaking-side chains to create hydrophilic units that become soluble, or breaking regular bonds causing the formation of small molecular weight monomers that are water soluble. Some of these types of hydrolysis reactions are illustrated in FIG. 1.

The relative amount of the water-soluble polymers and/or water-reactive polymers and elastomer used in the elastomeric material of the present invention can also be selected to minimize phase separation. For example, the weight ratio of the water-soluble polymers and/or water-reactive polymers to the elastomer can be about 0.01 to about 3 (and all values and ranges therebetween), in some embodiments about 0.1 to about 2.5, and in some embodiments about 1 to about 2.

In one non-limiting embodiment, one or more of the water-soluble polymers and/or water-reactive polymers that are used in the elastomeric material are selected from the group consisting of Poly(vinyl alcohol) (PVA), Polyethylene glycol (PEG), Polyglycolide (PGA), Poly(lactic acid) (PLA), polysaccharides, collagen, polyvinylpyrrolidone, hydroxyethyl acrylate or methacrylate, hydroxypropyl acrylate or methacrylate, acrylic or methacrylic acid, acrylic or methacrylic esters or vinyl pyridine, acrylamide, vinyl acetate, vinyl alcohol, and ethylene oxide.

C. OPTIONAL COMPONENTS

The elastomeric material can include one or more optional components. The use of one or more optional component can create one or more additional phases in the elastomeric material; however, this is not required. When the one or more optional components are insoluble with the elastomer and the water-soluble polymer and/or water-reactive polymer, an additional phase in the elastomeric material may be formed. The use of the one or more optional components is generally used to improve the mechanical properties of the composite material.

The optional components include plasticizer, compatibilizer, binder, polyester, filler, adhesion additions, reactive and/or swellable additive. The content of the one or more optional components in the elastomeric material (when used) is about 1 vol. % to 60 vol. % (and all values and ranges therebetween), typically about 2 vol. % to 40 vol. %, and more typically about 3 vol. % to 30 vol. %. One or more of the optional components can optionally be dissolvable or degradable by hydrolysis.

1. Plasticizer

A plasticizer can optionally be used in the elastomeric material of the present invention. The plasticizer (when used) can facilitate in rendering the water-soluble polymer melt-processible. Typically, the weight ratio of the water-soluble polymer to the plasticizer (when used) is about 1-50:1 (and all values and ranges therebetween), typically about 2-25:1, and more typically about 3-15:1. The plasticizer content in the elastomeric material of the present invention (when used) is generally about 1 vol. % to about 40 vol. % (and all values and ranges therebetween), typically about 2 vol. % to about 30 vol. %, more typically 5 vol. % to about 25 vol. %, and even more typically about 5 vol. % to about 15 vol. %.

Suitable plasticizers include, but are not limited to, polyhydric alcohol plasticizers, such as, but not limited to, sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), poiyols (e.g., ethylene glycol, glycerol, propylene glycol, dipropylene glycol, butylene glycol, and hexane triol), manganese chloride tetrahydrate, magnesium chloride hexahydrate etc. Other suitable plasticizers are hydrogen bond-forming organic compounds which do not have hydroxyl group, including, but not limited to, urea and urea derivatives; anhydrides of sugar alcohols such as, but not limited to, sorbitan; animal proteins such as, but not limited to, gelatin; vegetable proteins such as, but not limited to, sunflower protein, soybean proteins, cotton seed proteins; and mixtures thereof. Other suitable plasticizers can include phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic acids can also be used, such as, but not limited to, copolymers of ethylene and acrylic acid, polyethylene grafted with maleic acid, polybutadiene-co-acrylic acid, polybutadiene-co-maleic acid, polypropylene-co-acrylic acid, polypropylene-co-maleic acid, and other hydrocarbon based acids. A low molecular weight plasticizer is typically selected, such as less than about 20,000 g/mol, typically less than about 5,000 g/mol and more typically less than about 1,000 g/mol.

Through selective control over the nature of the water-soluble polymer (e.g., molecular weight, viscosity, etc.), the nature of the plasticizer, and the relative amounts of the water-soluble polymer and plasticizer, the resulting plasticized water-soluble polymer can achieve a melt viscosity that is similar to that of the elastomer, which further helps minimize phase separation during formation of the elastomeric material. In one non-limiting embodiment, the ratio of the melt viscosity of the elastomer to the plasticized water-soluble polymer is about 0.6 to about 2.5 (and all values and ranges therebetween), in some embodiments about 0.8 to about 2.2, and in some embodiments about 0.9 to about 2. For example, the plasticized water-soluble polymer can have an apparent melt viscosity of about 10 to about 400 Pascal seconds (Pas) (and all values and ranges therebetween), in some embodiments about 20 to about 200 Pas, and in some embodiments about 30 to about 80 Pas, as determined at a temperature of 195° C. and a shear rate of 1000 sec$^{-1}$. Likewise, the apparent melt viscosity of the elastomer can be about 20 to about 500 Pascal seconds (Pas) (and all values and ranges therebetween), in some embodiments about 30 to about 200 Pas, and in some embodiments about 40 to about 100 Pas, as determined at a temperature of 195° C. and a shear rate of 1000 sec$^{-1}$.

The plasticizer can be optionally added to form a single phase in the binder or interfacial phase between the water-soluble polymer and the elastomer.

2. Compatibilizer

One or more compatibilizers can also be used in the elastomeric material to further enhance the compatibility between the elastomeric phase and the water-soluble polymer in the elastomeric material. When used, such compatibilizer typically constitutes about 1 vol. % to about 20 vol. % of the elastomeric material (and all values and ranges therebetween), typically about 1 vol. % to about 15 vol. %, and more typically about 2 vol. % to 10 vol. %. Non-limiting examples of compatibilizers include both homopolymers and copolymers, i.e., polyethylene, ethylene copolymers such as, but not limited to, polypropylene, propylene copolymers, and polymethylpentene polymers. An olefin copolymer can include a minor amount of non-olefinic monomers, such as, but not limited to, styrene, vinyl acetate, diene, or acrylic and non-acrylic monomer.

Non-limiting examples of compounds containing functional groups acting as compatabilizers include, but are not limited to, aliphatic carboxylic acids; aromatic carboxylic acids; esters; acid anhydrides and acid amides of these acids; imides derived from these acids and/or acid anhydrides; aliphatic glycols or phenols; isocyanates, such as, but not limited to, toluene diisocyanate and methylenebis-(4-phenyl isocyanate); oxazolines, such as, but not limited to, 2-vinyl-2-oxazoline; epoxy compounds, such as, but not limited to, epichlorohydrin and glycidyl methacrylate; aliphatic amines (e.g., monoamines, diamines, amines, or tetramines); aromatic amines, such as, but not limited to, m-phenylenediamine; and so forth. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide and, natural fats and oils such as, but not limited to, soybean oil, tung oil, caster oil, linseed oil, hempseed oil, cottonseed oil, sesame oil, rapeseed oil, peanut oil, *camellia* oil, olive oil, coconut oil and sardine oil; unsaturated carboxylic acid such as, but not limited to, acrylic acid, butenoic acid, crotonic acid, vinyl acetic acid, methacrylic acid, pentenoic acid, angelic acid, tiglic acid, 2-pentenoic acid, 3-pentenoic acid, .alpha.-ethylacrylic acid, .beta.-methylcrotonic acid, 4-pentenoic acid, 2-methyl-2-pentenoic acid, 3-methyl-2-pentenoic acid, oc-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleosteric acid, oleic acid, eicosapentaenic acid, erucic acid, docosadienic acid, docosatrienic acid, docosatetraenic acid, docosapentaenic acid, tetracosenoic acid, hexacosenoic acid, hexacodienic acid, octacosenoic acid, and tetraaconitic acid; ester, acid amide or anhydride of these unsaturated carboxylic acid above; etc.

Maleic anhydride-modified polyolefins are particularly suitable for use in compatabilizing olefinic elastomers and water soluble binders. Such modified polyolefins are typically formed by grafting maleic anhydride onto a polymeric backbone material. Such maleated polyolefins are available from E. I. du Pont de Nemours and Company under the designation Fusabond®, such as, but not limited to, the P Series (chemically-modified polypropylene), E Series (chemically-modified polyethylene), C Series (chemically-modified ethylene vinyl acetate), A Series (chemically-modified ethylene acrylate copolymers or terpolymers), or N Series (chemically-modified ethylene-propylene, ethylene-propylene diene monomer (EPDM) or ethylene-octene). Alternatively, maleated polyolefins are also available from Chemtura Corp. under the designation Polybond® and Eastman Chemical Company under the designation Eastman G™ series.

3. Other Components

One or more other components can optionally be incorporated into the elastomeric material. In one non-limiting embodiment, the elastomeric material can include a binder material such as a starch. Modified starches, for instance, can be used that have been chemically modified by typical processes known in the art (e.g., esterification, etherification, oxidation, enzymatic hydrolysis, etc.). Starch ethers and/or esters such as, but not limited to, hydroxyalkyl starches, carboxymethyl starches, etc., can be particularly desirable. Representative hydroxyalkyl starches such as, but not limited to, hydroxyethyl starch, hydroxypropyl starch, hydroxybutyl starch, and derivatives thereof can be used. Starch esters, for instance, can be prepared using a wide variety of anhydrides (e.g., acetic, propionic, butyric, and so forth), organic acids, acid chlorides, or other esterification reagents. The degree of esterification can vary as desired, such as from 1 to 3 ester groups per glucosidic unit of the starch. The starch, when used, is generally present at about 0.1 vol. %-40 vol. % (and all values and ranges therebetween), typically at about 0.2 vol. %-30 vol. %, more typically about 1 vol. %-20 vol. %, still more typically 1 vol. %-15 vol. %, and yet more typically 2 vol. %-10 vol. %.

Furthermore, the elastomeric material can optionally contain one or more biodegradable polyesters. Examples of suitable biodegradable polyesters include aliphatic polyesters, such as, but not limited to, polycaprolactone, polyesteramides, modified polyethylene terephthalate, polylactic acid (PLA) and its copolymers, terpolymers based on polylactic acid, polyglycolic acid, polyalkylene carbonates (such as polyethylene carbonate), polyhydroxyalkanoates (PHA), poly-3-hydroxybutyrate (PHB), poly-3-hydroxyvalerate (PHV), poly-3-hydroxybutyrate-co-4-hydroybutyrate, poly-3-hydroxybutyrate-co-3-hydroxyvalerate copolymers (PH BV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aromatic polyesters and modified aromatic polyesters; and aliphatic-aromatic copolyesters. The polyester (when used) is generally present at about 0.1-40 vol. % (and all values and ranges therebetween), typically at about 0.2-30 vol. %, more typically about 1-20 vol. %, still more typically 1-15 vol. %, and yet more typically 2-10 vol. %.

Other optional components can include fillers, such as carbon black or silica which modify the properties of the material or reduce cost. The addition of silica, carbon black, and other fillers into the rubber or soluble polymer phase can be used to increase its hardness and wear resistance, or modify its frictional properties (e.g., through the addition of MoS2) to achieve a desired end result. The filler (when used) is generally present at about 0.1-40 vol. % (and all values and ranges therebetween), typically at about 0.2-30 vol. %, more typically about 1-20 vol. %, still more typically 1-15 vol. %, and yet more typically 2-10 vol. %.

Formulations of the elastomeric material can sometimes require some modest stress to completely break up the residual structure (e.g., the dissolvable rubber loses cohesion, but does not generally disperse unless there is some mechanical force applied, which can be an impact, a slight flow, etc.). Generally, the less force required to completely disperse the particle of elastomer (e.g., rubber particles, etc.), the more successful and acceptable the formulation. This requirement for added force can be largely alleviated through the addition of reactive, and/or swellable (R/S) additions which react with the fluid that elastomeric material is exposed to so as to generate stress through expansion, reaction, gas generation, etc. Examples of such materials include the addition of CaO, which hydrates in water to expand, which can apply a force to break up the dissolvable rubber. Other examples of materials include clays, borohydrates, aluminum-gallium alloy particles, magnesium or magnesium alloy particles or flakes, magnesium oxide, iron, silicon, zinc, aluminum, aluminum alloy, magnesium, magnesium alloy that undergoes a volume change, gas generating reaction, decomposition, reaction, or other force-generating interaction upon exposure to water, brine and/or oil, or other type of fluid environment sufficient to accelerate the dispersion of the rubber in the elastomeric material. The reactive and/or swellable addition (when used) is generally present at about 0.1-35 vol. % (and all values and ranges therebetween), typically at about 0.2-25 vol. %, more typically about 1-20 vol. %, still more typically 1-15 vol. %, and yet more typically 2-10 vol. %.

In one non-limiting embodiment, the one or more optional components include manganese chloride tetrahydrate, magnesium chloride hexahydrate, and/or glycerol. In another and/or additional non-limiting embodiment, the one or more optional components include a material that undergoes a volume change, gas-generating reaction, decomposition, reaction, and/or other force-generating interaction upon exposure to fluid about said composite material, said secondary components formulated to facilitate in a break-up and/or dispersion of said second material in said composite material. In another and/or additional non-limiting embodiment, the one or more optional components include one or more components selected from the group consisting of manganese chloride tetrahydrate, magnesium chloride hexahydrate, and glycerol. In another and/or additional non-limiting embodiment, the one or more optional components include one or more components selected from the group consisting of magnesium alloys, aluminum alloys, oxides, carbonates, nickel-containing alloys, and/or iron-based alloys. In another and/or additional non-limiting embodiment, the one or more optional components include one or more components selected from the group consisting of calcium oxide, magnesium oxide, iron, silicon, zinc, aluminum, aluminum alloy, magnesium, and magnesium alloy. In another and/or additional non-limiting embodiment, the one or more optional components include one or more components selected from the group consisting of carbon black, glass fiber, fumed silica or other high surface area material, and/or which can be flake or fibrous in nature, and which can optionally also be used to add color. In another and/or additional non-limiting embodiment, the one or more optional components include a compatibilizer, adhesion addition, or combinations thereof. In another and/or additional non-limiting embodiment, the one or more optional components include one or more components selected from the group consisting of polyvinylpyrrolidone (PVP), $MnCl_2.4H_2O$ and $MgCl_2.6H_2O$, which components optionally tie or bind together the elastomer and the water-soluble polymer and/or water-reactive polymer.

The composite material can be processed so as to allow controlled contiguity (touching of the particles) of the elastomer from 0% (elastomer fully dispersed in composite material) to 70% or more (the elastomer is clustered in the composite material). Generally, the composite material is processed so that the elastomer is from 0% to 30% contiguity. The degree of contiguity of the elastomer can be controlled by various processes such as agglomeration, coating, pre-pressing, sigma blending, dry-blending, or other controlled mixing or blending technique that can control the degree of mixing of the elastomer with the water-soluble polymer and/or water-reactive polymer.

The composite material can be formulated to be moldable into a final shape, bulk moldable, and/or machinable into a final shape.

The composite material is generally formulated to dissolve or hydrolyze in water or in a water-based solution at an appreciable rate (e.g., at least 10% dissolution or hydrolyzation in a 2-3 hour period) only at elevated temperatures (e.g., temperature of 55° C. or greater).

The composite material is generally formulated to exhibit a shore A hardness of 70-99 (ASTM D2240-15), and typically 82-92. The composite material has a limited compressive set (e.g., 20-85% and all values and ranges therebetween), and typically below 50% (ASTM D395-16e1).

The composite material can be formulated to begin breaking down by initial swelling before dissolution; however, this is not required. Such swelling can occur in the phase formed of the water-soluble polymer and/or water-reactive polymer, and then followed by dissolution in the water-soluble polymer and/or water-reactive polymer. The swelling can be caused by hydration, carbonation, and/or oxidation of one or more materials in the composite material (e.g., CaO, MgO, Fe, Mg, Li, Ca, Zn, montmorrilinate, clay, polyacrylate, or other water-swellable expandable materials). Also or alternatively, the water-soluble polymer and/or water-reactive polymer can be formulated to swell, expand, and/or react to cause expansion in water at a rate faster than, or at a high temperature than, the dissolution or degradation of the water-soluble polymer and/or water-reactive polymer.

The composite material can optionally include a coating material that is formulated to degrade by one or more means selected from the group consisting of exposure to at least a predetermined temperature, after a certain time period, exposure to a certain chemical, exposure to electricity, exposure to a certain electromagnetic wave. Such coating partially or fully encapsulates the other components of the composite material. The coating can be a flexible coating; however, this is not required. The coating is generally formed of a polymer or metal material. The coating can be used to control when and/or the rate of dissolution and//or degradation of the composite material.

The composite material includes a binder. The binder can have a differential solubility such that it dissolves very slowly at temperatures below about 50° C. to about 70° C., and at a higher rate above 70° C. to 150° C. and any value or range therebetween. The binder can include a starch such as a modified starch.

In summary, the invention is directed to a degradable, elastomeric composite material comprised of a continuous matrix of at least two phases. A first phase includes a first material and a second phase includes a second material. The continuous matrix has a desired elastomeric property set that defines the overall mechanical and elastomeric properties of the composite material. The first material is a polymer that is dissolvable in a fluid, degradable in a fluid, or combinations thereof and constitutes about 5 vol. % to about 60 vol. % of the composite material. The second material includes one or more elastomers and constitutes about 5 vol. % to about 90 vol. % of the composite material. The first material can be a) a water-soluble polymer having low solubility below about 30° C. and increased solubility at about 70° C.-130° C., or b) a polymer that is degradable by hydrolysis or solvates into soluble elements such as monomers or chemically altered soluble polymers. The first material can be selected to have an acceptable degradation rate at 55° C., 70° C., 100° C., 135° C., or 180° C., and has low reactivity at temperatures below about 30° C. The first material can be a liquid-soluble polymer including one or more materials selected from the group consisting of poly(vinyl alcohol) (PVA), polyethylene glycol (PEG), polyglycolide (PGA), poly(lactic acid) (PLA), polysaccharides, collagen, polyvinyl pyrrolidone, hydroxyethyl acrylate or methacrylate, hydroxypropyl acrylate or methacrylate, acrylic or methacrylic acid, acrylic or methacrylic esters or vinyl pyridine, acrylamide, vinyl acetate, vinyl alcohol, and ethylene oxide. The second material can include one or more materials selected from the group consisting of natural rubber, vulcanized rubber, silicone, polyurethane, synthetic rubber, polybutadiene, nitrile rubber (NBR), polyisobutylene, acrylate-butadiene rubber, and styrene butadiene rubber. The composite material can further include one or more secondary components selected from the group consisting of plasticizer, compatibilizer, binder, polyester, filler, adhesion additions, reactive and/or swellable additive. The secondary component can be dissolvable or degradable by hydrolysis. The secondary component can form a third phase in the composite material. The secondary component can include a material that undergoes a volume change, gas generating reaction, decomposition, reaction, and/or other force-generating interaction upon exposure to fluid about said composite material. The secondary component can be formulated to facilitate in a break-up and/or dispersion of the second material in the composite material. The secondary component can include one or more components selected from the group consisting of manganese chloride tetrahydrate, magnesium chloride hexahydrate, and glycerol. The secondary component can include one or more components selected from the group consisting of magnesium alloys, aluminum alloys, oxides, carbonates, nickel-containing alloys, and/or iron-based alloys. The secondary component can include one or more components selected from the group consisting of calcium oxide, magnesium oxide, iron, silicon, zinc, aluminum, aluminum alloy, magnesium, and magnesium alloy. The secondary component can include one or more components selected from the group consisting of carbon black, glass fiber, and fumed silica. The secondary component can include a compatibilizer, adhesion addition, or combinations thereof. The secondary component can include one or more components selected from the group consisting of polyvinylpyrrolidone (PVP), $MnCl_2 \cdot 4H_2O$ and $MgCl_2 \cdot 6H_2O$ to tie or bind together the continuous matrix and second material. The secondary component can include plasticizer. The plasticizer can constitute about 1 vol. % to about 40 vol. % of the composite material. The secondary component can include a material formulated to swell before dissolution of said first material. The secondary component can include one or more materials selected from the group consisting of CaO, MgO, Fe, Mg, Li, Ca, Zn, montmorrilinate, clay, and polyacrylate. The composite material can derive at least about 80% of its hardness and mechanical response from the second material. The composite material can further include a coating material. The coating material can be formulated to degrade by one or more means selected from the group consisting of exposure to at least a predetermined temperature, after a certain time period, exposure to a certain chemical, exposure to electricity, exposure to a certain electromagnetic wave. The composite material can have a tensile strength of greater than about 500-2000 psig (ASTM D412), and typically greater than about 3500 psig. The composite material can have an ultimate elongation of at about 20%-200% (ASTM D412) (and all values and ranges therebetween), and typically about 75% and 115%. The composite material can be formulated to be as suitable for use as a sealing element, packer, or other downhole sealing component. The composite material can be formulated to be storable at about 30° C.-40° C. for an extended period of time (e.g., at least one month) once the parts are vacuum sealed so as to exhibit little or no degradation during storage (less than 1% degradation), and can be formulated to be thermally stable at temperatures of up to 140° C., and typically up to about 200° C. while in storage. The formed composite material can optionally be coated with a hydrophobic material to prevent premature degradation during handling and storage.

General formulations of the dissolvable elastomeric material in volume percent in accordance with the present invention as follows:

| Ingredients | Ex. 1 | Ex. 2 | Ex. 3 | Ex. 4 |
|---|---|---|---|---|
| Elastomer | 10%-90% | 15%-80% | 20%-75% | 15%-60% |
| WS or WR Polymer | 5%-60% | 10%-45% | 20%-40% | 20%-35% |
| Plasticizer | 0%-40% | 2%-30% | 5%-25% | 5%-15% |
| Compatibilizer | 0%-20% | 1%-20% | 1%-15% | 2%-10% |
| Binder | 0%-20% | 1%-20% | 1%-15% | 2%-10% |
| Polyester | 0%-20% | 1%-20% | 1%-15% | 2%-10% |
| Filler | 0%-20% | 1%-20% | 1%-15% | 2%-10% |
| R/S Additive | 0%-20% | 1%-20% | 1%-15% | 2%-10% |

Non-limiting specific examples of the dissolvable elastomeric material in accordance with the present invention are as follows:

Example 5

A dissolvable elastomeric material in accordance with the present invention formed of about 70 vol. % polyurethane rubber particles 30-100 μm in size bonded together in a plasticized PVOH matrix was found to have the same elongation to failure, tensile strength and compression strength as the original polyurethane rubber. At lower temperatures, the elastomeric material composite was able to be used in a similar manner as a part made of 100% polyurethane. The elastomeric material was submerged in about 185° F. (85° C.) fresh water and over 70% of the elastomeric material dissolved in about 5 hours leaving a 30-100 um powder and a flowable medium viscosity liquid.

Example 6

A dissolvable elastomeric material in accordance with the present invention formed of about 60 vol. % recycled vulcanized rubber particles about 100-1000 µm in diameter, about 30 vol. % PEG plasticized PLA as the matrix and about 10 vol. % glass fiber reinforcement was molded into a solid structure. The elastomeric material had tensile and hardness values within about 20% of the recycled vulcanized rubber material. The elastomeric material was placed in water and no degradation was seen at under about 122° F. (50° C.). Between about 122° F. (50° C.) and 212° F. (100° C.), over 70% of the elastomeric material dissolved in the heated water over about 30 hours resulting in a flowable mixture of about 100-100 µm (and all values and ranges therebetween) rubber particles and a higher viscosity liquid.

Example 7

A dissolvable elastomeric material in accordance with the present invention formed of about 75 vol. % polyurethane particles about 30-100 µm in size was bonded together in a PEG matrix. The elastomeric material was then coated with a flexible polysiloxane coating. The elastomeric material had properties within about 30% in durometer and compressive strength compared to the base polyurethane material. The elastomeric material was placed in about 194° F. (90° C.) water for 24 hours with no degradation or change to the mechanical properties of the elastomeric material. The elastomeric material was then placed into about 194° F. (90° C.) water for about 6 hours and then a chemical trigger that removed the polysiloxane coating was added. Over 70% of the elastomeric material then dissolved away in one hour leaving about 30-100 um polyurethane particles in a low viscosity liquid.

Example 8

A dissolvable elastomeric material in accordance with the present invention was formed of about 70 vol. % nitrile butadiene rubber, 18 vol. % poly vinyl alcohol, 3 vol. % glycerol, and 9 vol. % $MnCl_2 \cdot 4H_2O$. The hardness of the material was found to be between 78-95 Shore A. The compression set property according to ASTM D 395 was measured to be between 5%-60%. The material was placed in 3% KCl with temperatures ranging between 130° F. (54° C.)-150° F. (66° C.) and over 70% of the material was degraded in-between 10-20 hours. The thermoplastic melts into powdered NBR at 300° F. (150° C.)-392° F. (200° C.). The variation on the hardness w.r.t dissolution is illustrated in FIGS. 2A-2C. The dissolvable elastomeric material can also be used as a material for 3D printer as illustrated in FIGS. 3-4. FIG. 3 illustrated an extruded filament material formed of the dissolvable elastomeric material in accordance with the present invention. FIG. 4 represents a 3D printed seal that was formed by the extruded filament material. The extruded filament material was exposed to a temperature of about 374° F. (190° C.) when forming the seal. The final seal has an OD of about 4 inches and an ID of about 3 inches.

The mechanical properties of the formed seal was tested according to the following ASTM standards and was measured as follows:

| Mechanical Property | Test Method | Result |
| --- | --- | --- |
| Tear Strength | ASTM D624 | 32.1 ± 2.15 kN/m |
| Tensile Strength @ Yield | ASTM D 412 | 722.29 ± 23.2 psi |
| Tensile Strength @ Break | ASTM D 412 | 807.86 ± 49.31 psi |
| Tensile Elongation @Break | ASTM D 412 | 28.1 ± 7.71% |
| Tensile Elongation @ Yield | ASTM D 412 | 18.4 ± 3.39% |
| Compression Set @ 22 hr | ASTM D 395B | 75% |
| Compression Set @ 70 hr | ASTM D 395B | 78% |

Mechanical properties of the seal were also measured at 149° F., 194° F., 275° F. and 302° F. and the results are as follows:

| Properties | 149° F. (65° C.) | 194° F. (90° C.) | 275° F. (135° C.) | 302° F. (150° C.) |
| --- | --- | --- | --- | --- |
| Tensile @ Break | 123.71 ± 22.62 | 64.54 ± 5.95 | 41.62 ± 5.07 | 49.6 ± 3.19 |
| Elongation @ Break | 237 ± 20.6 | 176 ± 3.67 | 151 ± 15.4 | 146 ± 19.7 |
| Compression Set @ 22 hrs | 90.02% | 91.6% | 94.69% | Not Tested |
| Compression Set @ 70 hrs | 94.27% | 93.47% | 100% | Not Tested |

Example 9

A dissolvable elastomeric material in accordance with the present invention was formed of about 60 vol. % nitrile butadiene rubber, 16 vol. % poly vinyl alcohol, 8 vol. % glycerol, and 16 vol. % polyvinylpyrrolidone. The hardness of the material was found to be between 78-95 Shore A. The compression set property according to ASTM D 395 was measured to be between 5-60%. The material was placed in 3% KCl with temperatures ranging between 130 F-150° F. and over 70% of the material was degraded in-between 10-20 hours. The degraded elastomeric material was easy to break by hand. The variation on the hardness with respect to dissolution is illustrated in FIGS. 5A-5C. FIG. 6 represents a seal that was formed from the elastomeric material. The final seal has an OD of about 4 inches and an ID of about 3 inches.

Example 10

A dissolvable elastomeric material in accordance with the present invention was formed of about 50 vol. % nitrile butadiene rubber, 47.5 vol. % poly vinyl alcohol 47.5 vol. %, and 2.5 vol. % glycerol. The hardness of the material was found to be between 78-95 Shore A. The compression set property according to ASTM D 395 was measured to be in-between 5%-60%.

Example 11

A dissolvable elastomeric material in accordance with the present invention was formed with 70 vol. % nitrile butadiene rubber, 10 vol. % glycerol, 8 vol. % PVP/MnCl$_2$ and 4 vol. % calcium oxide. The hardness of the material ranges between 60 and 80 Shore A. The compression set property according to ASTM D 395 was measured to be between 5%-60%. The material was placed in 3 vol. % KCl with temperatures ranging between 130° F.-150° F. and over 70% of the material was degraded between 10-20 hours into particles under size of 0.5 mm.

Figure 7:
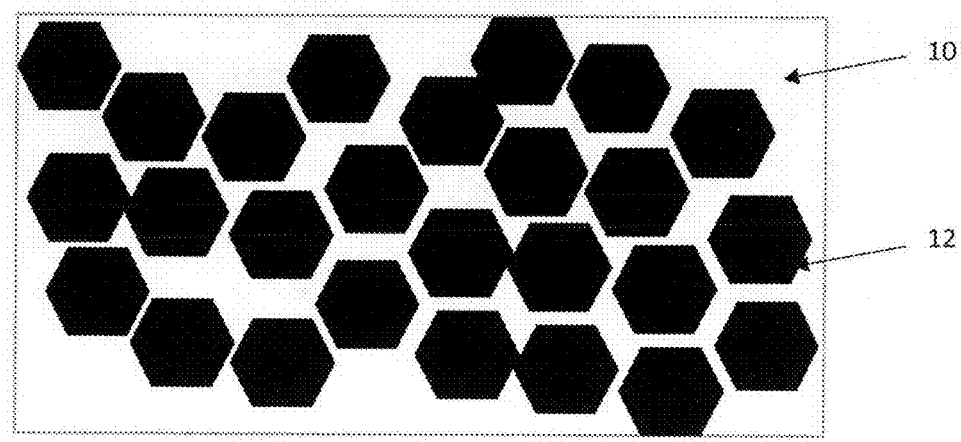
FIG. 7 is an illustration of an elastomeric material in accordance with the present invention formed from elastomeric particles in a dissolvable matrix.
Figure 8:
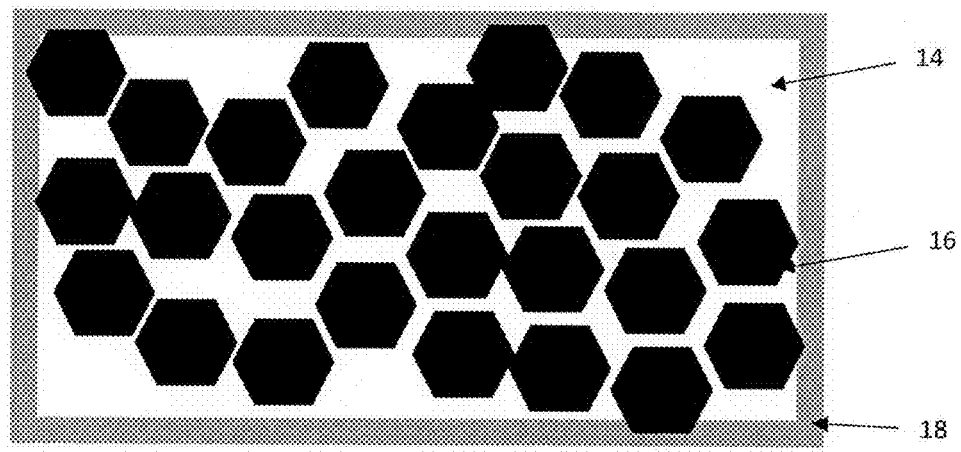
FIG. 8 is an illustration of an elastomeric material in accordance with the present invention formed from elastomeric particles in a water soluble matrix with the entire composite surrounded by a protective coating.
Figure 9:
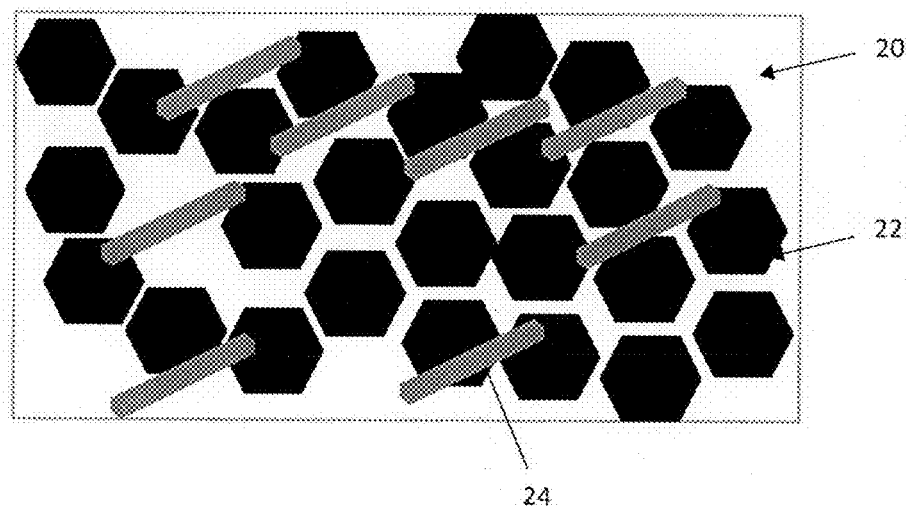
FIG. 9 is an illustration of an elastomeric material in accordance with the present invention formed from a dissolving matrix with elastomeric particles and mechanically reinforcement from particles or fibers.

FIGS. 7-9 illustrate various non-limiting elastomeric materials in accordance with the present invention. FIG. 7 illustrates an elastomeric material formed from elastomeric particles (12) in a dissolvable matrix (10). FIG. 8 illustrates an elastomeric material formed from elastomeric particles (16) in a water soluble matrix (14) with the entire composite surrounded by a protective coating (18). The outer coating is generally formulated to be triggered or removed by some method (e.g., pH change, change in surrounding fluid composition, electrical charge, exposure to magnetic field, pressure change, exposure to a certain electromagnetic wave, exposure to ultrasonic waves, etc.). FIG. 9 illustrates an elastomeric material formed from a dissolving matrix (20) with elastomeric particles (22) and mechanically reinforcement from particles or fibers (24).

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A degradable, elastomeric composite material comprised of a first material and a second material, said first material is a polymer that is dissolvable in a fluid, degradable in a fluid, or combinations thereof and constitutes about 5 vol. % to about 60 vol. % of said composite material, said second material is particles of elastomer that are evenly disbursed in said first material and constitutes about 5 vol. % to about 90 vol. % of said composite material, said particles of elastomer having a particle size of 30-1000 μm, said elastomer has a stretched length that is at least 20% greater than its relaxed unstretched length, said elastomer includes olefinic elastomer, ethylene elastomer, vulcanized elastomer and/or nitrile rubber, said second material having a different composition than said first material, said first material is a water-soluble and/or water-reactive polymer that has a solubility at below about 30° C. that is less than a solubility at about 70-130° C., said composite material formulated to have at least 10% dissolution or hydrolyzation in a 2-3 hour period at a temperature of at least 55° C.

2. The composite material as defined in claim 1, wherein said first material is a liquid-soluble polymer including one or more materials selected from the group consisting of poly(vinyl alcohol) (PVA), polyethylene glycol (PEG), polyglycolide (PGA), poly(lactic acid) (PLA), polysaccharides, collagen, polyvinyl pyrrolidone, hydroxyethyl acrylate or methacrylate, hydroxypropyl acrylate or methacrylate, acrylic or methacrylic acid, acrylic or methacrylic esters or vinyl pyridine, acrylamide, vinyl acetate, vinyl alcohol, and ethylene oxide.

3. The composite material as defined in claim 1, wherein said second material includes one or more materials selected from the group consisting of natural rubber, vulcanized rubber, silicone, polyurethane, synthetic rubber, polybutadiene, nitrile rubber (NBR), polyisobutylene, acrylate-butadiene rubber, and styrene butadiene rubber.

4. The composite material as defined in claim 1, further including one or more secondary components selected from the group consisting of plasticizer, compatibilizer, binder, polyester, filler, adhesion additions, reactive and/or swellable additive.

5. The composite material as defined in claim 4, wherein said secondary component is dissolvable or degradable by hydrolysis.

6. The composite material as defined in claim 4, wherein said secondary component forms a third phase in said composite material.

7. The composite material as defined in claim 4, wherein said secondary component includes a material that undergoes a volume change, gas-generating reaction, decomposition, reaction, and/or other force-generating interaction upon exposure to fluid about said composite material, said secondary components formulated to facilitate in a break-up and/or dispersion of said second material in said composite material.

8. The composite material as defined in claim 4, wherein said secondary component includes one or more components selected from the group consisting of manganese chloride tetrahydrate, magnesium chloride hexahydrate, and glycerol.

9. The composite material as defined in claim 4, wherein said secondary component includes one or more components selected from the group consisting of magnesium alloys, aluminum alloys, oxides, carbonates, nickel-containing alloys, and/or iron-based alloys.

10. The composite material as defined in claim 4, wherein said secondary component includes one or more components selected from the group consisting of calcium oxide, magnesium oxide, iron, silicon, zinc, aluminum, aluminum alloy, magnesium, and magnesium alloy.

11. The composite material as defined in claim 7, wherein said secondary component includes one or more components selected from the group consisting of carbon black, glass fiber, and fumed silica.

12. The composite material as defined in claim 4, wherein said secondary component includes a compatibilizer, adhesion addition, or combinations thereof.

13. The composite material as defined in claim 4, wherein said secondary component includes one or more components selected from the group consisting of polyvinylpyrrolidone (PVP), MnCl$_2$4H$_2$O and MgCl$_2$6H$_2$O to tie or bind together the continuous matrix and second material.

14. The composite material as defined in claim 4, wherein said secondary component includes plasticizer, said plasticizer constitutes about 1 vol. % to about 40 vol. % of said composite material.

15. The composite material as defined in claim 4, wherein said secondary component includes a material formulated to swell before dissolution of said first material, said secondary component including one or more materials selected from the group consisting of CaO, MgO, Fe, Mg, Li, Ca, Zn, montmorrilinate, clay, and polyacrylate.

16. The composite material as defined in claim 1, wherein said composite material derives at least about 80% of its hardness and mechanical response from said second material.

17. The composite material as defined in claim 1, further including a coating material, said coating material formulated to degrade.

18. A degradable, elastomeric composite material consisting essentially of a continuous matrix having first and second phases, and at least one secondary component, said first phase of said continuous matrix including a first material, said second phase of said continuous matrix including a second material, said first material is a polymer that is dissolvable in a fluid, degradable in a fluid, or combinations thereof and constitutes about 5 vol. % to about 60 vol. % of said composite material, said second material includes particles of elastomer that are evenly disbursed in said first material and constitutes about 5 vol. % to about 90 vol. % of said composite material, said one or more optional secondary components constitute up to about 60 vol. % of said composite material, said particles of elastomer having a particle size of 30-1000 min, said elastomer has a stretched length that is at least 20% greater than its relaxed unstretched length, said elastomer includes olefinic elastomer, ethylene elastomer, vulcanized elastomer and/or nitrile rubber, said second material having a different composition than said first material, said first material is a water-soluble and/or water reactive polymer that has a solubility at below about 30° C. that is less than a solubility at about 70-130° C., said composite material formulated to have at least 10% dissolution or hydrolyzation in a 2-3 hour period at a temperature of at least 55° C., said at least one secondary component includes plasticizer, compatibilizer, binder, polyester, filler, adhesion addition, reactive and/or swellable additive, said at least one optional component having a different composition from said first and second materials.

19. The composite material as defined in claim 18, wherein said first material is a liquid-soluble polymer including one or more materials selected from the group consisting of poly(vinyl alcohol) (PVA), polyethylene glycol (PEG), polyglycolide (PGA), polylactic acid (PLA), polysaccharides, collagen, polyvinyl pyrrolidone, hydroxyethyl acrylate or methacrylate, hydroxypropyl acrylate or methacrylate, acrylic or methacrylic acid, acrylic or methacrylic esters or vinyl pyridine, acrylamide, vinyl acetate, vinyl alcohol, and ethylene oxide; said second material includes one or more materials selected from the group consisting of natural rubber, vulcanized rubber, silicone, polyurethane, synthetic rubber, polybutadiene, nitrile rubber (NBR), polyisobutylene, acrylate-butadiene rubber, and styrene butadiene rubber.

20. The composite material as defined in claim 19, wherein said first material constitutes about 8 vol. % to about 45 vol. % of said composite material, said second material constitutes about 15 vol. % to about 80 vol. % of said composite material, said one or more optional secondary components constitute about 2 vol. % to about 40 vol. % of said composite material.

21. The composite material as defined in claim 20, wherein said first material constitutes about 20 vol. % to about 40 vol. % of said composite material, said second material constitutes about 15 vol. % to about 60 vol. % of said composite material, said one or more optional secondary components constitute about 3 vol. % to about 30 vol. % of said composite material.

22. The composite material as defined in claim 21, wherein said one or more optional secondary components has one or more properties selected from the group consisting of a) dissolvable by hydrolysis, b) degradable by hydrolysis, c) forms a third phase in said composite material, d) undergoes a volume change upon exposure to fluid about said composite material, e) undergoes a gas-generating reaction upon exposure to fluid about said composite material, f) undergoes a decomposition upon exposure to fluid about said composite material, g) undergoes a reaction upon exposure to fluid about said composite material, h) undergoes a force-generating interaction upon exposure to fluid about said composite material, i) formulated to facilitate in a break-up of said second material in said composite material, and j) formulated to facilitate in a dispersion of said second material in said composite material.

23. The composite material as defined in claim 22, wherein said secondary component includes one or more materials selected from the group consisting of manganese chloride tetrahydrate, magnesium chloride hexahydrate, glycerol, magnesium alloys, aluminum alloys, oxides, carbonates, nickel-containing alloys, iron-based alloy, calcium oxide, magnesium oxide, iron, silicon, zinc, aluminum, aluminum alloy, magnesium, magnesium alloy, carbon black, glass fiber, fumed silica, polyvinylpyrrolidone (PVP), $MnCl_2 4H_2O$ and $MgCl_2 6H_2O$, lithium, calcium, montmorrilinate, clay, and polyacrylate.

24. The composite material as defined in claim 23, wherein said secondary component adds color to said composite material.

25. The composite material as defined in claim 18, wherein said composite material has a hardness of 70-99 shore A hardness.

26. The composite material as defined in claim 23, wherein said composite material has a hardness of 70-99 shore A hardness.

27. The composite material as defined in claim 25, wherein said composite material has a hardness of 82-92 shore A hardness.

28. A degradable, elastomeric composite material comprised of a first material, a second material, and a secondary component, said first material is a polymer that is dissolvable in a fluid and/or degradable in a fluid, said first material constitutes about 5-60 vol. %© of said composite material, said second material is particles of elastomer that are evenly disbursed in said first material, said second material about 5-90 vol. % of said composite material, said secondary component constitutes 1-60 vol. % of said composite material, said particles of elastomer have a particle size of 30-1000 µm, said elastomer has a stretched length that is at least 20% greater than its relaxed unstretched length, said elastomer includes olefinic elastomer, ethylene elastomer, vulcanized elastomer and/or nitrile rubber, said first material includes 1) vinyl alcohol polymers; 2) copolymers of vinyl alcohol; 3) monomers of vinyl pyrrolidone, hydroxyethyl acrylate, hydroxyethyl methacrylate, hydroxypropyl acrylate, hydroxypropyl methacrylate, acrylic acid, methacrylic acid, acrylic esters, acrylic vinyl pyridine, methacrylic esters, methacrylic vinyl pyridine, acrylamide, vinyl acetate, vinyl alcohol, ethylene oxide, and/or polyvinylpyrrolidone; 4) polyamides; 5) polyesters; and/or 6) polycarbonates, said first material is a water-soluble and/or water-reactive polymer that has a solubility and/or dissolution rate of less than 1% after five hours at a temperature of below about 30° C. and has a solubility and/or dissolution rate of at least 10% after three hours at a temperature of at least 55° C. in water and/or brine, said secondary component includes plasticizer, compatibilizer, binder, filler, adhesion additions, reactive and/or swellable additive, said secondary component having a different composition from said first and second material.

29. The composite material as defined in claim 28, wherein said first material includes polyvinyl alcohol), polyethylene glycol, polyglycolide, poly(lactic acid), polysaccharides, collagen, polyvinylpyrrolidone, hydroxyethyl acrylate, hydroxyethyl methacrylate, hydroxypropyl acrylate, hydroxypropyl methacrylate, acrylic acid, methacrylic acid, acrylic ester, methacrylic ester, vinyl pyridine, acrylamide, vinyl acetate, vinyl alcohol, and/or ethylene oxide.

30. The composite material as defined in claim 28, wherein said second material includes one or more materials selected from the group consisting of natural rubber, vulcanized rubber, silicone, polyurethane, synthetic rubber, polybutadiene, nitrile rubber (NBR), polyisobutylene, acrylate-butadiene rubber, and styrene butadiene rubber.

31. The composite material as defined in claim 29, wherein said second material includes one or more materials selected from the group consisting of natural rubber, vulcanized rubber, silicone, polyurethane, synthetic rubber, polybutadiene, nitrile rubber (NBR), polyisobutylene, acrylate-butadiene rubber, and styrene butadiene rubber.

32. The composite material as defined in claim 28, wherein said secondary component forms a third phase in said composite material.

33. The composite material as defined in claim 31, wherein said secondary component forms a third phase in said composite material.

34. The composite material as defined in claim 28, wherein said secondary component includes manganese chloride tetrahydrate, magnesium chloride hexahydrate, glycerol, magnesium alloys, aluminum alloys, oxides, carbonates, nickel-containing alloys, iron-based alloys, calcium oxide, magnesium oxide, iron, silicon, zinc, aluminum, aluminum alloy, magnesium, magnesium alloy, carbon black, glass fiber, fumed silica, polyvinylpyrrolidone (PVP), $MnCl_2 4H_2O$, $MgCl_2 6H_2O$, CaO, MgO, Li, Ca, montmorilinate, clay, and/or polyacrylate.

35. The composite material as defined in claim 33, wherein said secondary component includes manganese chloride tetrahydrate, magnesium chloride hexahydrate, glycerol, magnesium alloys, aluminum alloys, oxides, carbonates, nickel-containing alloys, iron-based alloys, calcium oxide, magnesium oxide, iron, silicon, zinc, aluminum, aluminum alloy, magnesium, magnesium alloy, carbon black, glass fiber, fumed silica, polyvinylpyrrolidone (PVP), $MnCl_2 4H_2O$, $MgCl_2 6H_2O$, CaO, MgO, Li, Ca, montmorilinate, clay, and/or polyacrylate.

36. The composite material as defined in claim 28, further including an outer polymer coating material, said outer polymer coating material formulated to degrade, said outer polymer coating material encapsulating said first and second materials.

37. The composite material as defined in claim 35, further including an outer polymer coating material, said outer polymer coating material formulated to degrade, said outer polymer coating material encapsulating said first and second materials.

* * * * *